Figure 6:
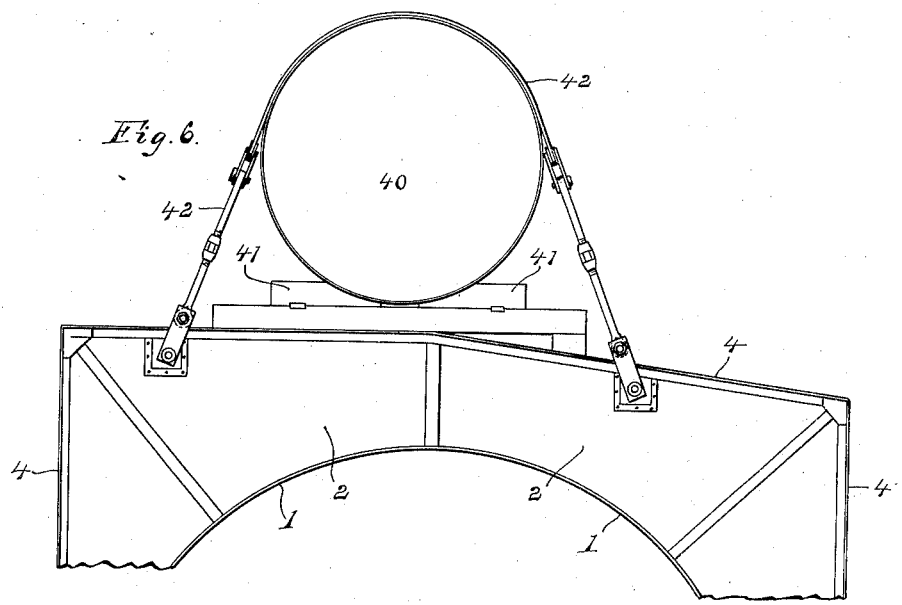

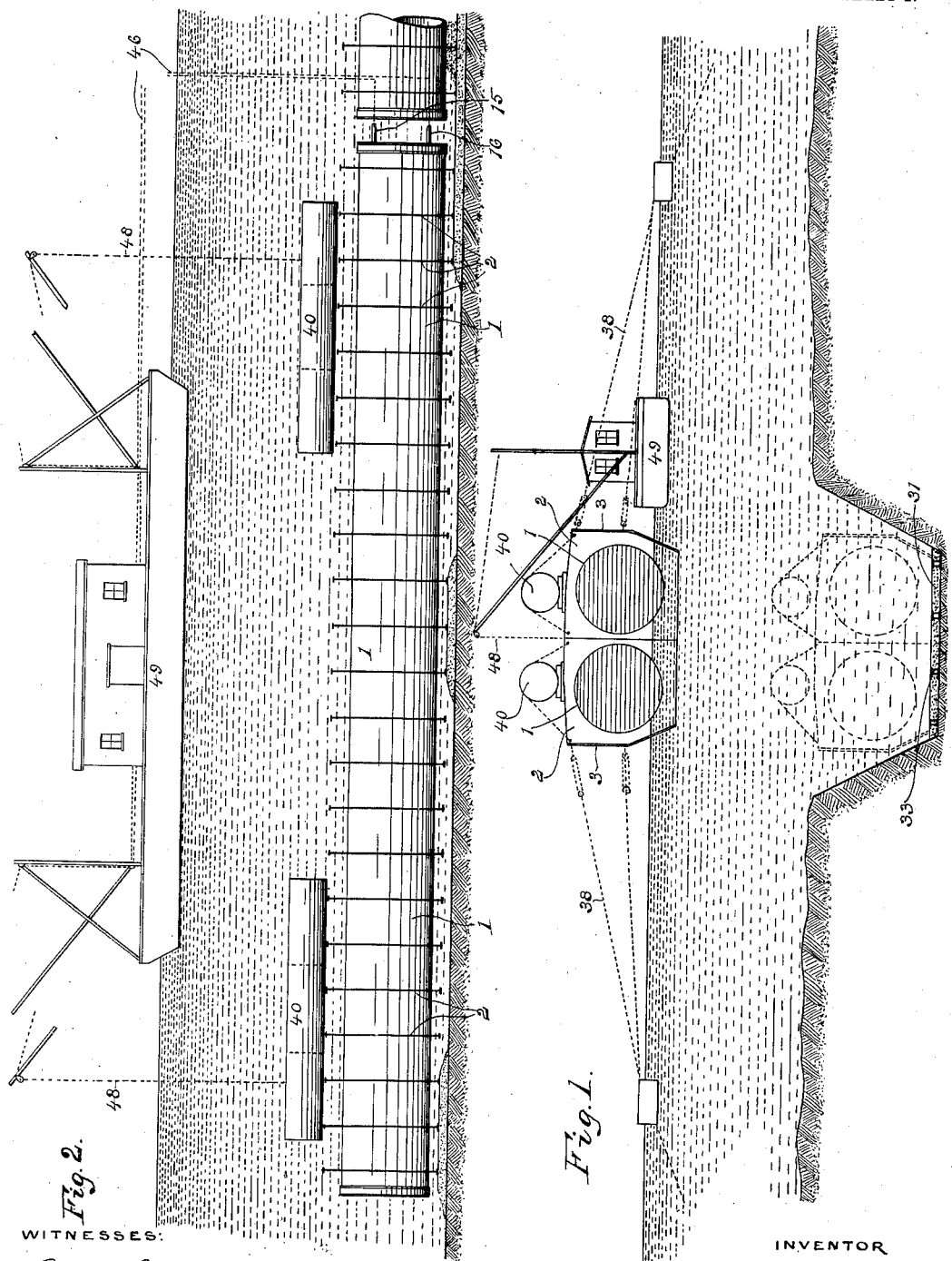

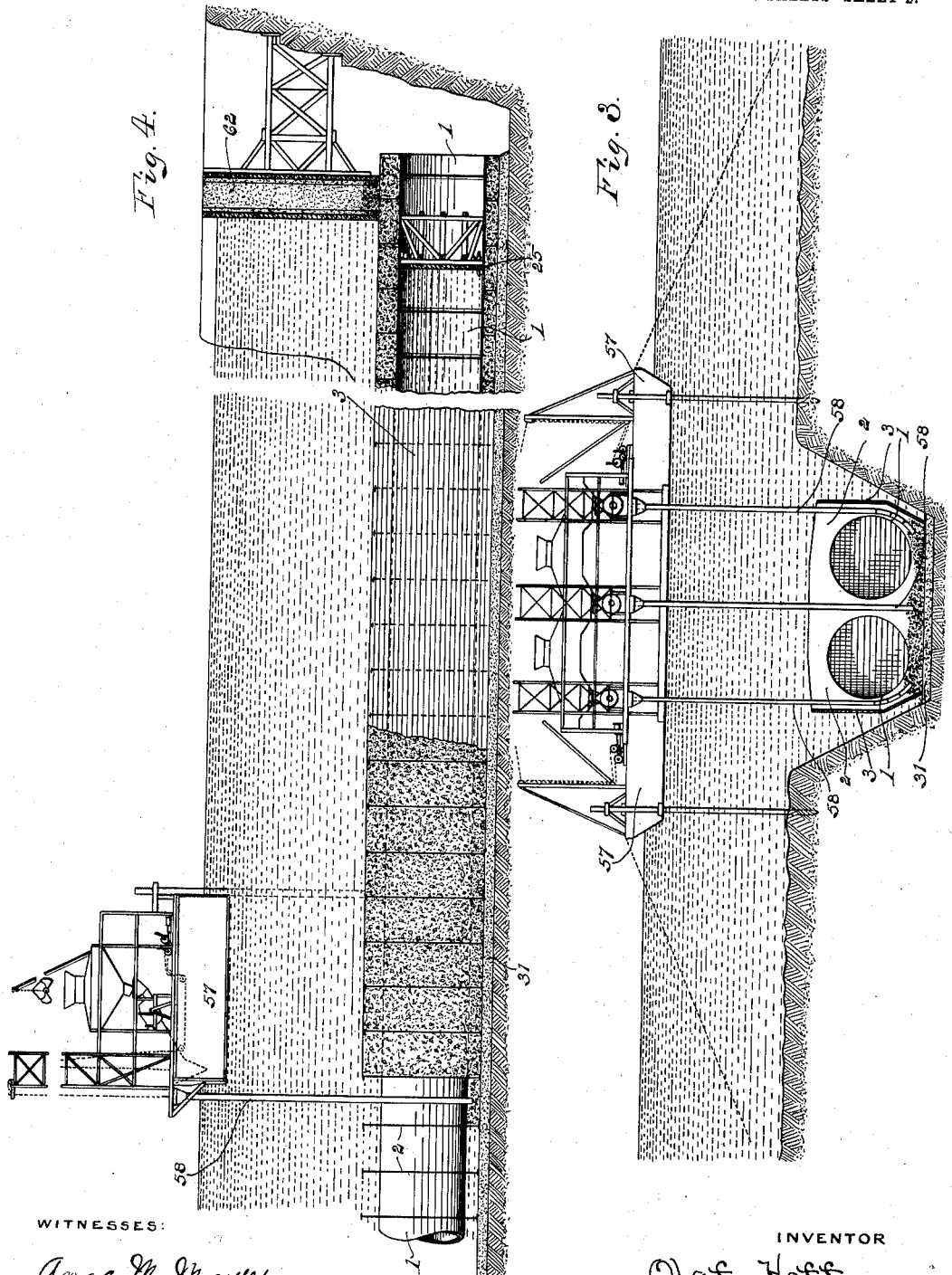

O. HOFF.
SUBAQUEOUS TUNNEL.
APPLICATION FILED APR. 20, 1908.

907,356.

Patented Dec. 22, 1908.
9 SHEETS—SHEET 3.

WITNESSES:
Anna M. Mayer
A. M. Dorr

INVENTOR
By Olaf Hoff
Attorneys.

O. HOFF.
SUBAQUEOUS TUNNEL.
APPLICATION FILED APR. 20, 1908.
907,356.
Patented Dec. 22, 1908.
9 SHEETS—SHEET 4.
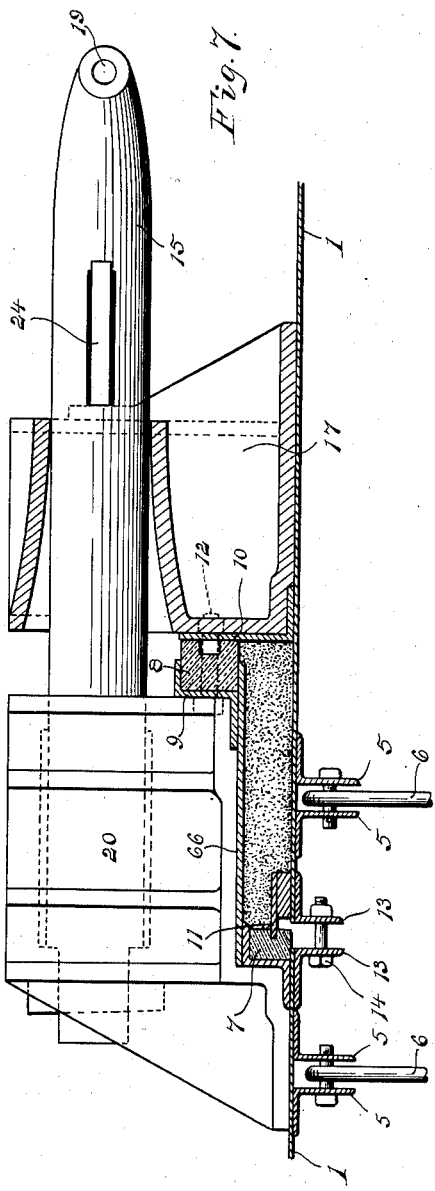
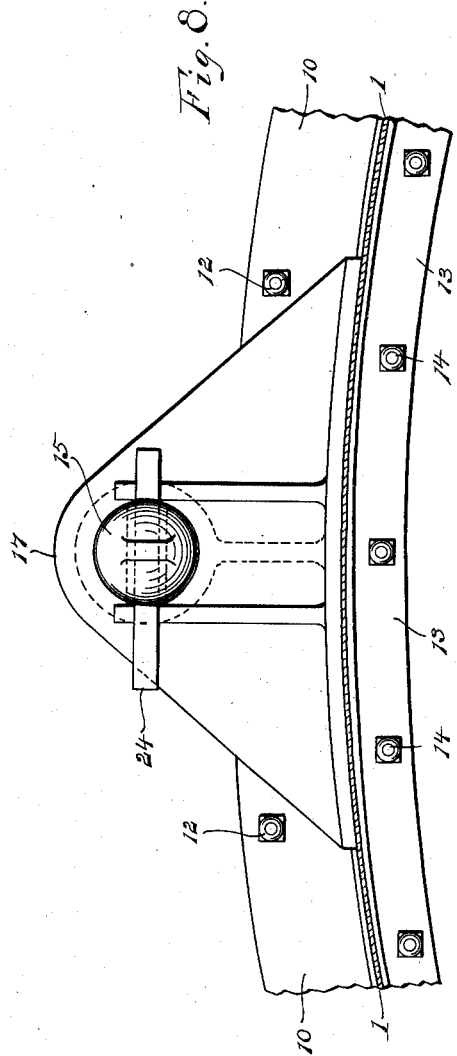
WITNESSES:
Anna M. Mayer.
A. M. Dow.
INVENTOR
Olaf Hoff
By Barthel & Barthel
Attorneys.

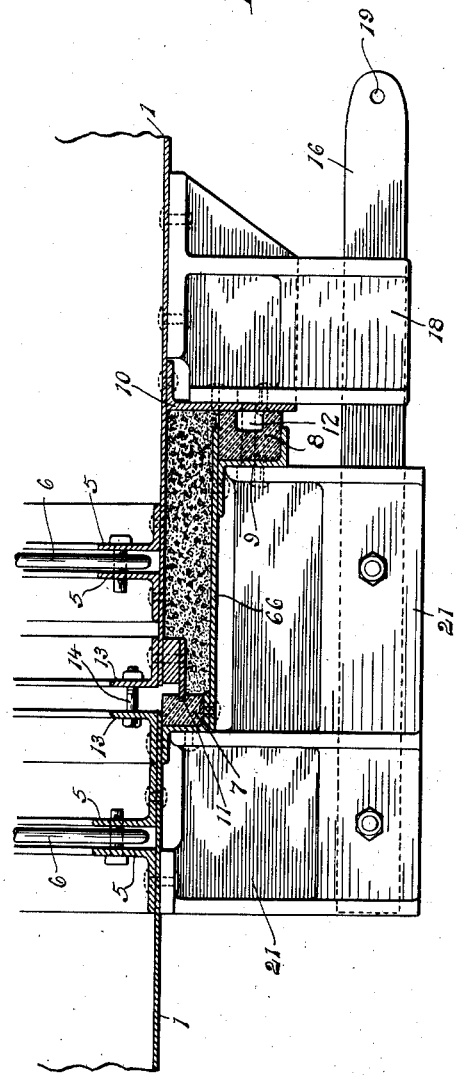
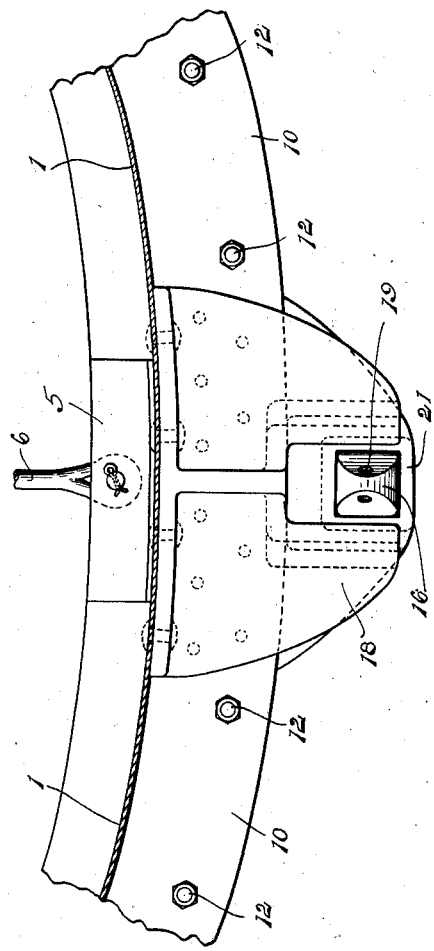

O. HOFF.
SUBAQUEOUS TUNNEL.
APPLICATION FILED APR. 20, 1908.
907,356.
Patented Dec. 22, 1908.
9 SHEETS—SHEET 6.
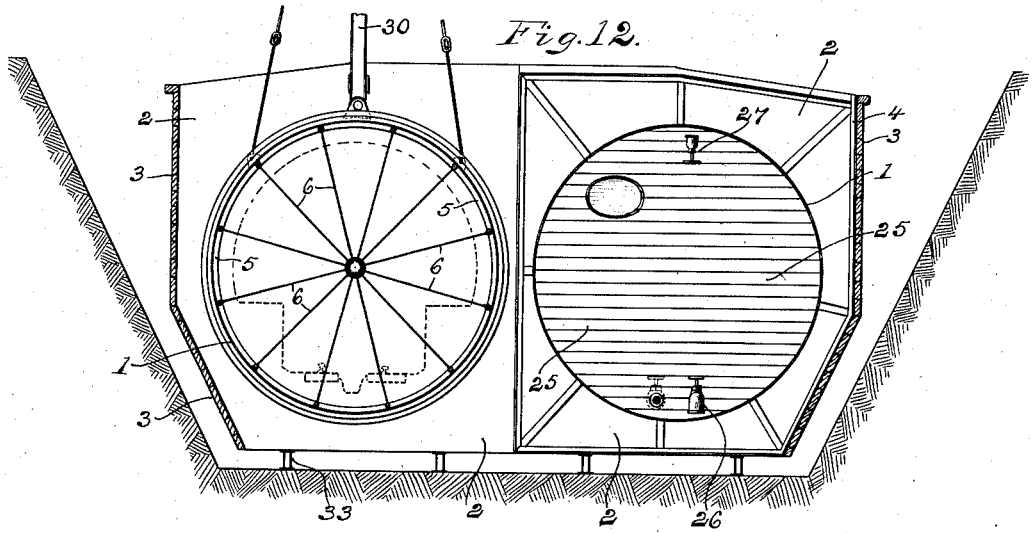
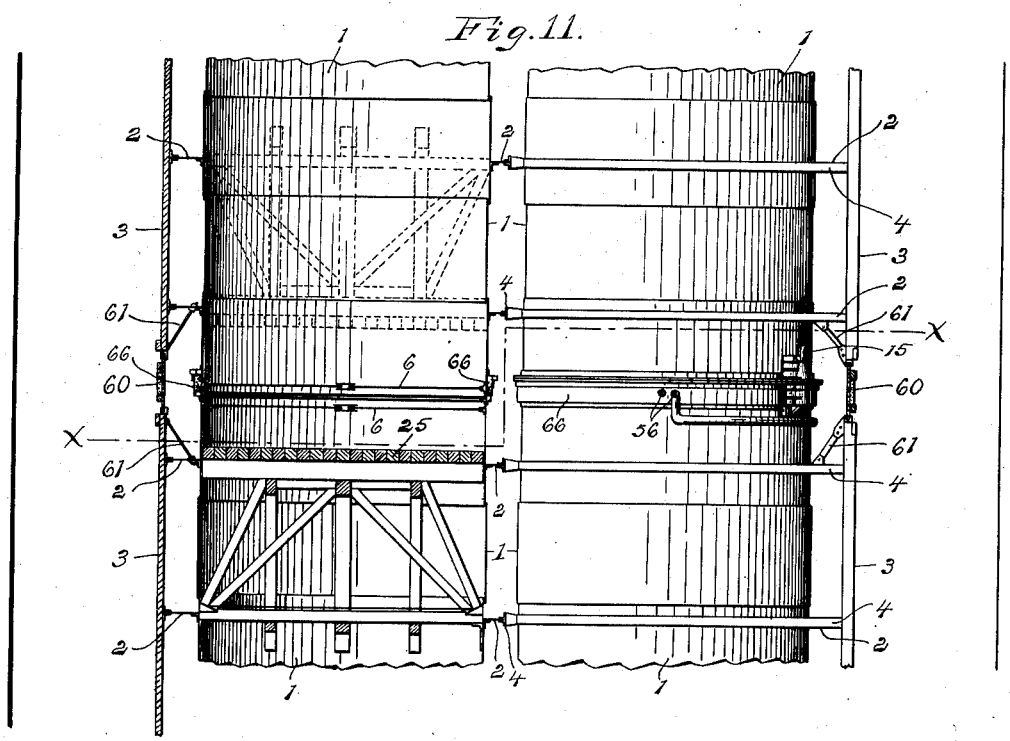
WITNESSES:
Anna M. Mayer
A. M. Dow
INVENTOR
Olaf Hoff
By Barth & Smith
Attorneys.

O. HOFF.
SUBAQUEOUS TUNNEL.
APPLICATION FILED APR. 20, 1908.
907,356.
Patented Dec. 22, 1908.
9 SHEETS—SHEET 7.
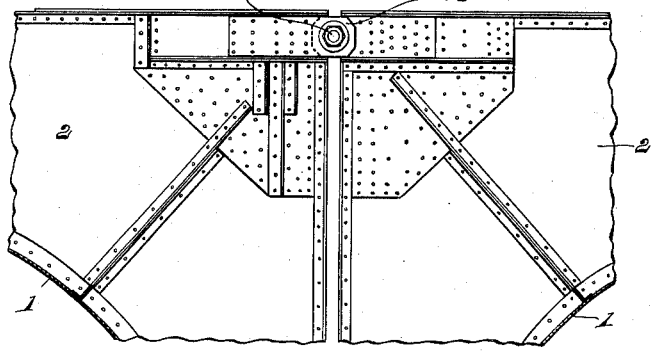
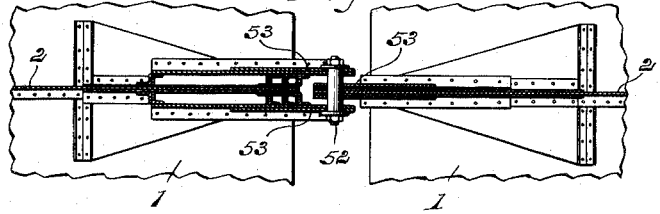
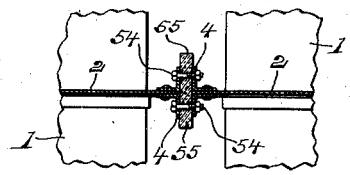
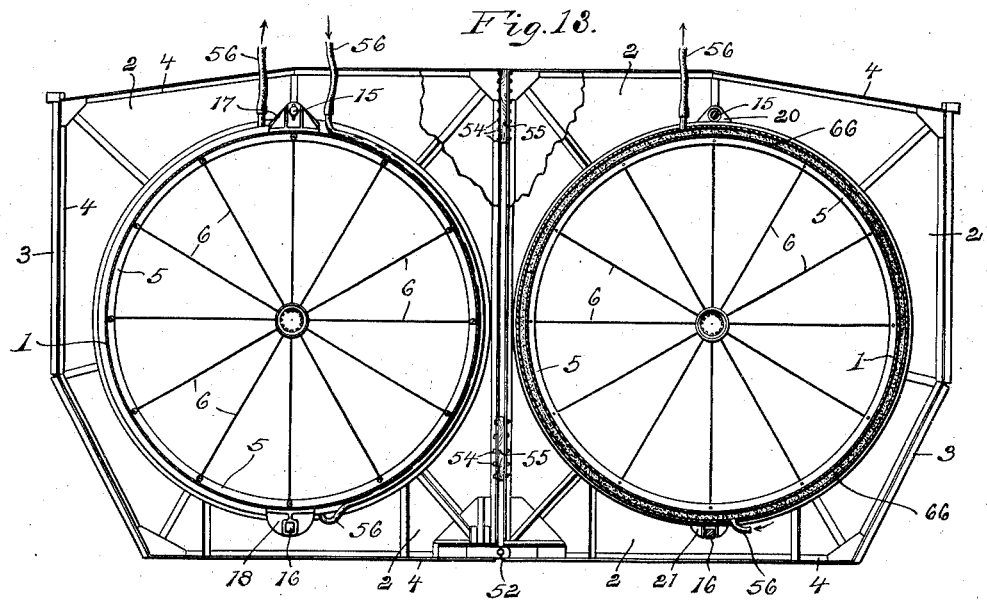
WITNESSES:
Anna M. Mayer.
A. M. Dow.
INVENTOR
Olaf Hoff
By Barthol Shailer
Attorneys.

O. HOFF.
SUBAQUEOUS TUNNEL.
APPLICATION FILED APR. 20, 1908.
907,356.
Patented Dec. 22, 1908.
9 SHEETS—SHEET 8.
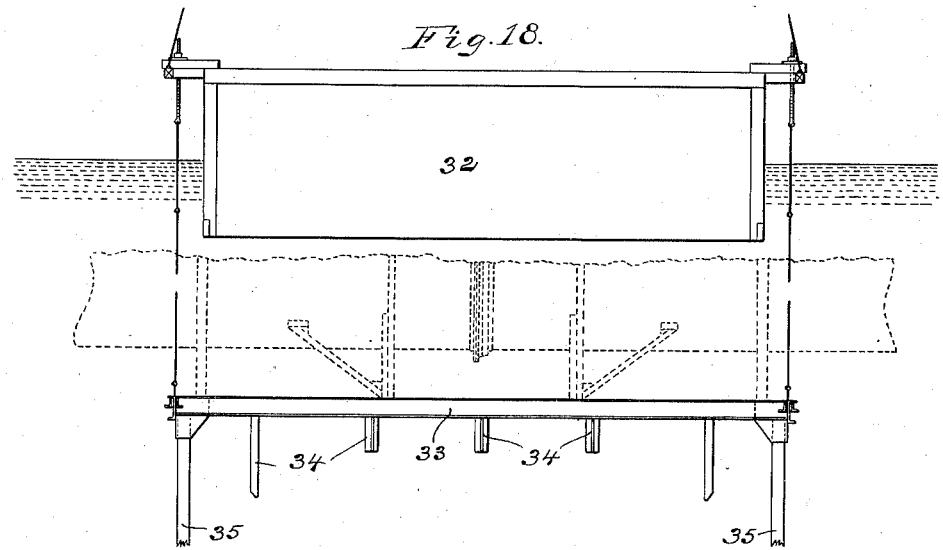
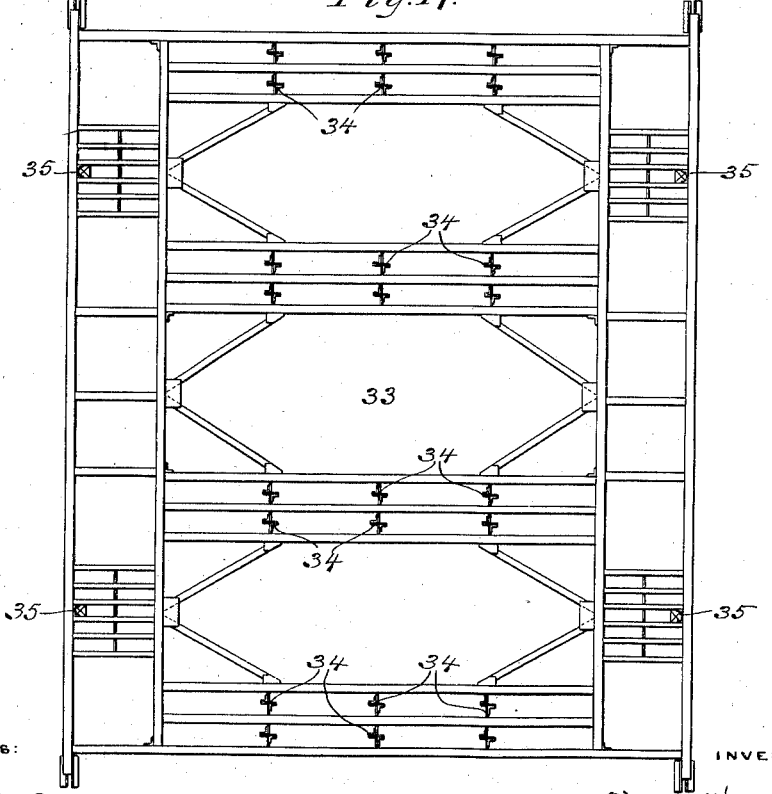

O. HOFF.
SUBAQUEOUS TUNNEL.
APPLICATION FILED APR. 20, 1908.
907,356.
Patented Dec. 22, 1908.
9 SHEETS—SHEET 9.
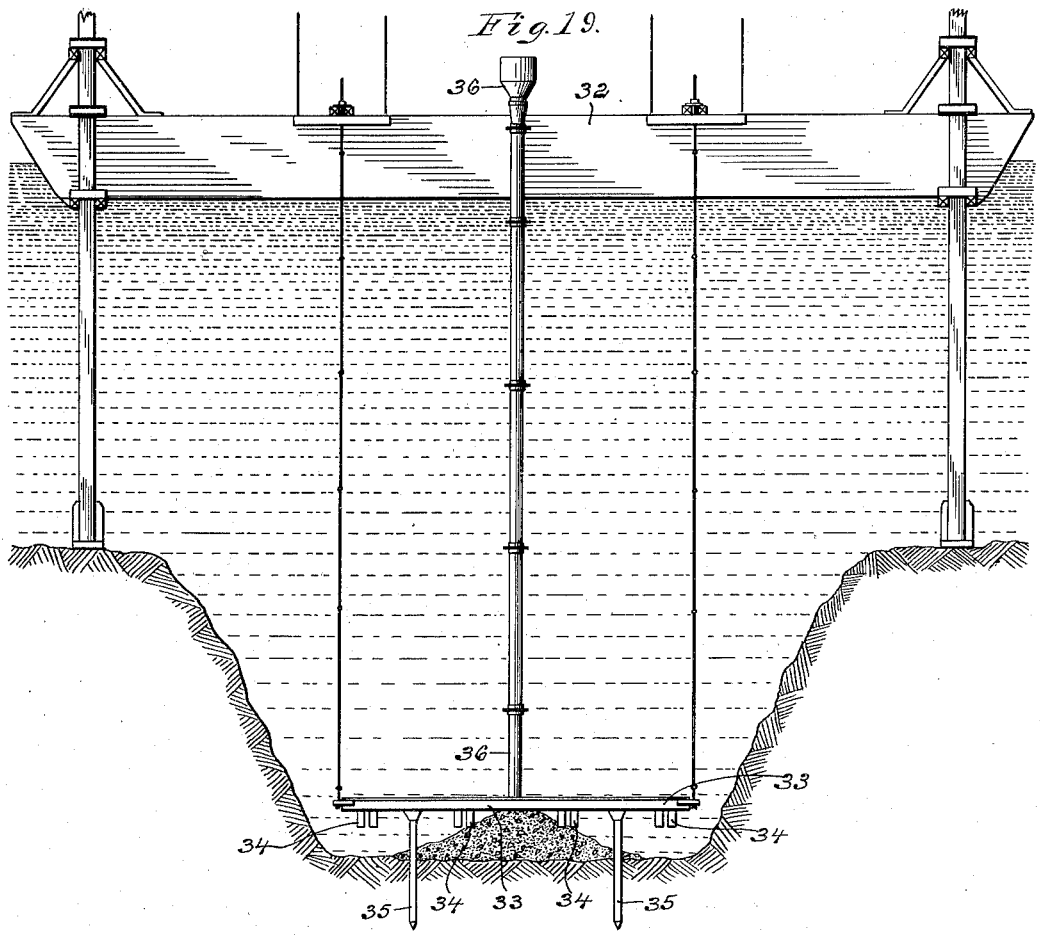
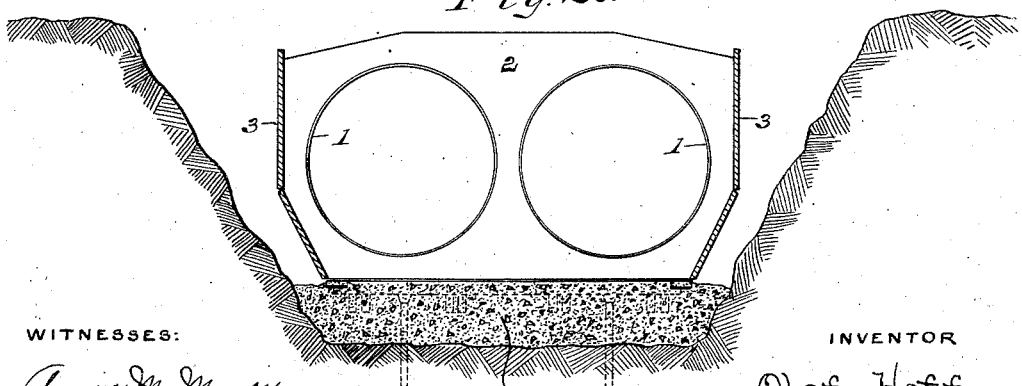

UNITED STATES PATENT OFFICE.

OLAF HOFF, OF NEW YORK, N. Y.

SUBAQUEOUS TUNNEL.

No. 907,356.   Specification of Letters Patent.   Patented Dec. 22, 1908.

Application filed April 20, 1908. Serial No. 428,013.

*To all whom it may concern:*

Be it known that I, OLAF HOFF, a citizen of the United States of America, residing at New York, in the county of New York and State of New York, have invented certain new and useful Improvements in Subaqueous Tunnels, of which the following is a specification, reference being had therein to the accompanying drawings.

This invention relates to the construction of that class of subaqueous tunnels, which are formed by a series of preconstructed tunnel tube sections built on shore, launched and floated to the tunnel site and then sunk to position one after another, in a trench prepared to receive them.

My invention embodies certain improvements in the structural features of the tunnel and in the method of carrying out the construction which is especially devised for the building of tunnels across navigable waters where it is important to carry on the work expeditiously and by such a method as will offer the least possible temporary surface obstruction to navigation, and will also make it possible to carry the tunnel to no greater depth than suffices to avoid interference with vessels passing thereover.

My construction provides a tunnel built wholly of steel and concrete and resting upon a foundation also preferably built of steel and concrete and forming part of the completed tunnel itself. Each steel tunnel tube section may be several hundred feet in length, and each tube is provided with temporary bulkheads to enable it when launched, to be floated to the tunnel site.

In sinking each section to its prepared water bed, water is gradually let into the tube and the sinking is controlled by air cylinders attached to the top of the section and adapted to support the weight of the tube, or nearly so, in sinking. After the section is sunk and joined to the previously laid section, it is embedded in concrete and one of the novel features of my invention consists in so constructing the tunnel tube section that it serves as a form for the concrete, and in providing a continuous foundation of concrete upon the water bed, all as more fully described hereinafter and shown in the accompanying drawings showing my invention as applied to a tunnel constructed of tunnel tube sections of the double or twin tube type.

Figure 5:
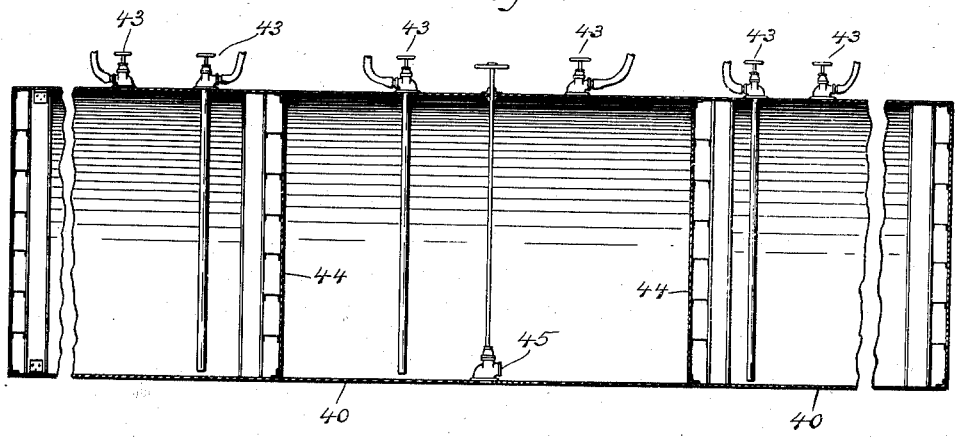

Figure 1 represents an end elevation of a tunnel tube section in position for sinking: Fig. 2 is a longitudinal vertical section of Fig. 1, showing the tunnel tube section as having been sunk to the water bed and illustrating the manner of connecting it to a previously laid section: Fig. 3 is a cross-section of a tunnel tube section in position upon the water bed and illustrating the method of embedding it in concrete: Fig. 4 is a sectional side elevation of Fig. 3, and showing the shore end of the tunnel section: Fig. 5 is a longitudinal vertical section through one of the air cylinders used in sinking each tunnel tube section: Fig. 6 is an end elevation of one of these air cylinders, showing, in connection therewith, the means for securing it in position upon the tunnel tube section: Figs. 7, 8, 9 and 10 represent in side and end elevations the means provided at the ends of the tube sections, for registering them with the previously laid sections and also showing in Figs. 7 and 9, in section, the joint connecting the sections: Fig. 11 is a sectional plan view of the joined ends of twin tunnel tube sections: Fig. 12 is a cross-section of the same on the line $x$—$x$ of Fig. 11: Fig. 13 is a similar cross-section substantially in the plane of the joint and illustrating the method of filling the joint with cement: Figs. 14 and 15 illustrate in elevation and horizontal section the means by which the twin tubes of a section are united: Fig. 16 is a horizontal section through the means used in addition to that shown in Figs. 14 and 15 for temporarily uniting the twin tubes of each section: Fig. 17 is a plan view of the grid used in the tunnel foundation: Fig. 18 is an end elevation of the grid, illustrating, also, the method of sinking it to position upon the water bed, the dotted lines indicating the manner in which the tunnel tube sections are intended to rest thereon after the foundation is completed: Fig. 19 is a cross-section through the trench forming the tunnel site and illustrating the method of building the foundation; and Fig. 20 is a cross-section of the completed foundation and of a tunnel tube section supported in position thereon.

The tunnel tube sections may be made several hundred feet in length according to the facilities for handling them and may be composed of one or more tubes 1, the drawings showing two tubes arranged parallel with each other in accordance with the usual practice followed in constructing tunnels for railway purposes. The shell of each tube is formed of steel plates and constructed in the manner of building the shells of steam boilers. For railway purposes, it may have a diameter of 23 feet, more or less, and may be formed of plates ⅜ of an inch in thickness. The tubes are reinforced on the outside by a series of transversely extending steel partitions or diaphragms 2 reinforced at their edges by angle flanges 4. These diaphragms are spaced apart and inclosed between side walls 3, preferably formed of wooden sheathing secured to the lateral edges of the diaphragms and spaced from the tubes thereby. The diaphragms are approximately of rectangular shape, being preferably cut away at the lower corners to conform the side walls 3 more nearly to the sides of the trench, and they extend completely around the tubes, forming a level base for the support of the tubes upon the water bed. They may be made in one piece but preferably are vertically divided between the tubes and secured together at their meeting edges. In this manner the tubes are set in an outer cradle-like frame which imparts great structural strength and at the same time serves as a form for embedding the tubes in concrete, the intervals between the diaphragms forming a series of separate pockets, as will appear more fully hereinafter. Half-way between each of the diaphragms the tubes are also preferably reinforced on the inside by stiffening angles 5, Fig. 13, to which are removably attached radial rods 6 as shown, the ends of the tubes being similarly reinforced to prevent deformation in handling.

Each section of tube is provided with means at the ends for joining the sections together. These means consist of a sleeve 66 secured to and forming an enlarged socket at the end of one tube (Figs. 7 and 9) and of two rubber gaskets 7 and 8, one seated on the bottom of the socket and the other seated in a channel-flange 9 secured at the extreme end of the sleeve. The end of the section to be joined thereto is adapted to enter the sleeve to the full depth of the socket, forming an annular space between it and the inner wall of the sleeve, and is provided with an outstanding flange 10 at a distance from its end and a longitudinally projecting edge-flange 11 at its extreme end, both so arranged that they coöperate with the gaskets 7 and 8 to form two water tight joints when the sections are joined together, suitable bolt-holes being provided in flanges 9 and 10 and gasket 8 for the insertion of bolts 12 to draw the sections together and permanently unite them. In this manner a water tight annular space is formed in the socket between the two joints, and after the sections are connected together upon the water bed, this space is filled with liquid cement, provision for filling being made in the construction of the sections, as will be explained more fully hereinafter. Provision is also preferably made to bolt the sections together on the inside after access is had thereto at a later stage in the construction, by securing angle-bars 13 to the inner surface of the tubes at their ends and providing bolts 14 passing through these bars. The space between the angle-bars 13 may be calked if necessary.

In order to insure an absolute and exact connection between the tubes, each tube is provided with one or more steel pilot-pins 15 and 16 (see Figs. 7 to 10) preferably placed one on top and one at the bottom. The pilot-pins are taper pointed and are adapted to guide the tubes into position by entering sockets in the guide lugs 17,—18 provided on the ends of the adjacent tubes. The guide lug 17 forms a bell-shaped socket to guide the pilot-pin 15 and the latter is provided with a key way for the insertion of a key 24 to hold it in engagement with the guide lug. The pilot-pins are provided with eyes 19 at the points for the attachment of cables thereto as will appear more fully hereinafter and one or both may be detachably secured in lugs 20—21 riveted to the end of the tube. To compensate for irregularities in the size of the tubes, the guide lug 18 is adapted to provide for a vertical play of its pilot-pin. Provision is also made for the attachment to the tubes of transit rods at 30 (see Fig. 12), which are detachably secured in prescribed positions and serve a well-known purpose in sinking the tubes.

Before each section is launched, the ends of the tubes are closed with temporary bulkheads 25, Fig. 12, to permit of the section being launched and towed to the tunnel site, and suitable valves 26—27 are provided in these bulkheads for the purpose hereinafter more fully described.

Before a section is launched, the site for it on the water bed is prepared, commencing at the shore end of the tunnel where the laying of the sections begins, by digging a trench of suitable depth to prevent the tunnel from forming an obstruction to navigation, and upon the bottom of this trench a suitable foundation 31 (Fig. 20) is built for each section.

In my construction I provide initially only for the support of each section at the two ends, and preferably in the middle by sinking a grid 33 constructed of structural steel substantially as shown in Figs. 17 and 18. Secured to this grid and suitably distributed throughout its length are a number of steel anchor posts 34 and 35 projecting downwardly from it, the anchor posts 35 being the longer and serving as piles. This grid is built on land and transported to the tunnel site where it is sunk by suspending it from a scow 32, as shown in Figs. 18 and 19, the scow being held in justified position by means of anchors or spuds, so that the grid will be dropped upon the exact spot where it is intended to lie. By pounding it down, the anchor posts 35 are driven into the ground till the whole grid lies at the required level above the water bed to support, at the proper height, the tube sections which are intended to lie. directly upon the grid. By means of the same scow, concrete is then poured through tremies 36 upon the water bed beneath the grid and into the interstices thereof till the whole grid is embedded within a solid mass of concrete. Instead of concrete, the foundation may be made by filling in with sand, gravel, broken stone or other suitable material and when so filled in the foundation is ready for sinking the section thereupon.

When a section has been floated to the site prepared for it, it is secured in justified position by means of suitable anchor cables 38 and each tube is then equipped with two air cylinders 40, see Figs. 1 and 6, which are supported in cradles 41 provided for them on top of the tubes and detachably and adjustably secured therein by straps 42 attached to the diaphragms of the tubes. The object of these air cylinders is to sustain by their buoyancy, the weight of the tubes when submerged and filled with water, so that the tubes will not be overstrained at any joint, or joints sprung during handling, causing leaks. These cylinders are proportioned according to the weight they will be required to support in sinking, and their buoyancy is adjusted by means of letting water into them or blowing water out of them. Compressed air is used for this purpose and the cylinders are equipped with proper flexible piping controlled by valves 43 (see Fig. 5). Each cylinder is preferably divided by bulkheads 44 into a central and two end compartments, the central compartments having also a water admission valve 45 in its underside with a valve stem extending through the top. When all is ready for sinking, wire ropes 46 (Fig. 2) are fastened to the eyes in the pilot-pins and passed down by divers to the end of the tubes already sunk and concreted in. There the ropes are passed through the sockets in the guide lugs corresponding to the pilot-pins, thence over suitable pulleys (not shown) fastened to the tubes near the guide lugs and up through the water to winches on the scow, all being so arranged that these ropes in connection with suitable lines secured to the outer ends of the section absolutely control its endwise movement in sinking. It is obvious that other means may be applied for sinking. The sinking of the section may be carried out with the aid of a single scow 49, by first opening the inlet valves 26 at the bottom of the bulkheads 25 in the tubes and likewise opening the corresponding air valves 27 at the top of the bulkheads. Water is thus let in and air let out, causing the tubes to sink at a speed dependent upon the inflow of the water, and are therefore under perfect control. The air confined between the bulkheads is permitted to gradually escape through the air valves 27 near the top of the tubes, which tubes continue to slowly sink until caught up by the air cylinders. These cylinders being adjusted, as previously described, to sustain the weight of the submerged tubes to within a small margin, say 10,000 pounds, at each end, the tubes are readily upheld, free to be raised or lowered, by means of two lines 48 (see Figs. 1 and 2) from suitable derricks on the scow 49 secured alongside. The further lowering of the section is thereby accomplished in a simple manner with the tubes evenly balanced and not overstrained at any point. As the tubes sink to the water bed, the lines 46 attached to the pilot-pins are taken up and the section is landed on the prepared foundation. By pulling in on these lines the section is moved towards the one to which it is to be joined till the tubes are in proper engagement for making the connections. A diver then secures the section from moving endwise out of engagement, by driving the wedge keys 24 into the pilot-pins 15 and the tubes are brought into proper alinement by the means spoken of heretofore.

When the alinement of the section is accomplished, the diver will insert the bolts 12 through the flanges 9 and 10, bolting them firmly together, and insert the necessary shims under the diaphragms to form an absolute even bearing at all points where the foundation is provided. The air cylinders 40 are next permitted to gradually fill with water, thus causing the weight of the tubes supported by them to be gradually transferred to the foundation and slackening the bands 42 so that they may be disconnected to release the cylinders which may then be floated to the top by expelling the water therefrom. The same air cylinders may be used for sinking each succeeding section.

Although the two tubes of each section are preferably connected and sunk at the same time, still if considered more expedient they may be sunk one at a time. If sunk in pairs, it is advisable to so connect them that one may be adjusted longitudinally with reference to the other within a few inches of movement, to provide for any difference in their length, and this adjustment may be provided for as shown in Figs. 14 and 15 by means of pintles 52 passing through spaced knuckles 53 secured to the diaphragms at at their meeting edges, any suitable number of such connections being provided. The tubes of each section are temporarily secured together while being floated to the tunnel site and placed in position, by bolts 54 passing through the angle flanges on the meeting edges of the diaphragms, suitable spacing blocks 55 being interposed between the flanges.

When the ends of the tube sections have been bolted together as described, the joints are tested to ascertain whether they are tight, by providing the sleeve 66 of each joint, before sinking, with two flexible connections 56, as shown in Fig. 13, which connections lead to the scow floating above. With a force pump attached to one connection and the other closed, water is forced by the pump through the annular space within the sleeve, and thus the tightness of the joint readily ascertained. When the joints have been found reasonably tight, pure cement grout is then pumped into the annular space through one of the connections until it comes out through the other connection as evidence that the space is completely filled. After the joints are thus completed, the tubes are ready to be concreted in. It is proposed to do this by means of tremies in the manner shown in Figs. 3 and 4 wherein 57 represents a scow from which the work is done and this scow is anchored transversely of the sunken tubes in such a manner that its position may be readily shifted as the work progresses, spuds being provided to hold the scow against wind and waves. The scow is equipped with an efficient outfit for mixing concrete on board and delivering same when mixed to the tremies 58 which are hung from the side of the scow and deliver the concrete as required, into the pockets between the diaphragms, from the bottom up. At those pockets which are between the places where the initial foundation is provided, the cement will be deposited directly upon the trench bottom, and thus a continuous cement foundation will be provided for the whole length of the tubes.

It is obvious that one or more pockets intermediate the end supports may be wholly or partially concreted in before the air cylinders are removed in which case the initial foundation in the middle may be omitted.

The advantage of the pocket construction as described, is that these pockets may be filled one at a time, thus preventing the exposure of the concrete to the action of the water by an extended spreading out, and consequent washing away of the cement contained therein. This is particularly true where the tunnel is laid across a fast flowing stream and, further, with suitable care in the handling of the tremies, the concrete can thus be deposited at a considerable depth by keeping the lower ends of the tremies well immersed in the outflowing concrete. On account of the shape of the pockets the lower ends of the tremies are made flexible as shown, and as the work in each pocket progresses, the tremies are correspondingly raised to deliver the concrete thereto to the full height of the pocket. When one pocket is filled, the scow is shifted to the next and the tremies lowered therein.

After the depositing of the concrete, the space between the side walls 3 and the trench sides may be filled in with sand, clay, stone or other suitable material, the character of this back filling depending largely upon the surrounding conditions, or in some places the wash of the river may be relied on to fill in these spaces. As it is necessary to leave an opening in the casing or side walls at the ends of the tube sections to provide access for the diver in making the connection, gates 60, (Fig. 11), are provided to close these openings, braces 61 being also provided to strengthen the casing at these points.

In order to make the connections at the shore ends of the tunnel, a pocket is dredged into the bank or shore and when the tubes have been sunk and concreted in, the shore end thereof is inclosed within a coffer dam or seawall 62, as shown in Fig. 4. The pocket is then pumped out and used as a working shaft for lining the tubes before making final connection with approach tunnels. To permit work on the inner concrete lining where such is required to be commenced as soon as possible, the bulkheads at the shore ends of the tubes and one in every other tube section should be built very heavy and water tight so as to be capable of resisting the full water pressure. The temporary bulkheads need not be as heavy. Through suitable valved apertures provided in these heavy bulkheads one section after another may be emptied of water and the bulkheads removed to give access to the section beyond. This particular construction of steel tube and the manner in which the joints between the sections are made, practically eliminates the possibility of leakage, and the general scheme of construction is such that the use of compressed air is dispensed with, eliminating its dangers and disadvantages and the necessity for the installation of an expensive plant.

While the construction of the tunnel as herein described and shown in the drawings is primarily devised for navigable waters and has been specifically designed for the tunnel under present construction across the Detroit River, it is adapted to meet the general requirements, and its structural features are adapted to be used, wherever the open trench method of building tunnels may be applied. It is also obvious that the construction may be variously modified within the scope of my invention to suit prevailing conditions, for instance the pockets may be filled only partly with concrete and the rest with other material, in which case the sheathing and the diaphragms or either need generally extend up only as far as the concrete.

The advantages of my construction in cost, safety and general applicability to meet the requirements, will be well understood by those skilled in the art, none of the steps in the construction involving any difficult engineering problems and the equipment required being easily procurable and representing but a small portion of the cost of construction.

I do not make in this application any claims on the method involved in the construction of the tunnel herein described as I have made it the subject matter of a separate application filed June 1, 1908, Ser. No. 435,904.

What I claim as my invention is:—

1. In a sub-aqueous tunnel, a preconstructed tunnel tube section composed of one or more tubes exteriorly provided at intervals with transverse diaphragms of substantially rectangular shape, the lower edges of the diaphragms forming a level base adapted to support the tube at intervals upon the water bed.

2. In a sub-aqueous tunnel, a preconstructed tunnel tube section composed of one or more tubes exteriorly provided at intervals with transverse diaphragms, the intervening spaces between said diaphragms being closed upon the sides and open at the top and bottom.

3. In a sub-aqueous tunnel, a preconstructed tunnel tube section composed of one or more tubes and an exterior frame comprising side walls and transverse partitions uniting them with the tube or tubes, the ends of the latter projecting beyond the ends of the frame and provided at said ends with means for connecting them with the tubes of like sections, the side walls leaving open gaps between them when the sections are joined.

4. In a subaqueous tunnel, a preconstructed tunnel tube section composed of one or more tubes and an exterior frame or cradle adapted to support the tube or tubes in position upon the water bed and to serve as a form for embedding the same in concrete, the frame having transverse partitions dividing the form into separate pockets.

5. In a subaqueous tunnel, a preconstructed tunnel tube section composed of one or more tubes and an exterior frame adapted to serve as a form for embedding the tube in concrete upon the water bed, the frame having transverse members dividing the form into separate compartments.

6. A subaqueous tunnel composed of one or more tubes parallel with each other and laid in a trench excavated upon the water bed and a body of concrete embedding the same upon the bottom of the trench, the tube or tubes being exteriorly provided at intervals with transverse diaphragms conforming approximately to the cross section of the trench and the concrete filling the intervening spaces between them and forming a continuous foundation below the same upon the bottom of the trench, the diaphragms forming a base for supporting the tube or tubes at intervals upon said foundation.

7. In a subaqueous tunnel, a preconstructed tunnel tube section composed of one or more tubes and an outer frame or cradle adapting the section to serve as the form for embedding the tube or tubes in concrete, the same consisting of a series of transverse diaphragms secured upon the tube or tubes and side walls secured to the edges of the diaphragms, the diaphragms being of a shape to support the section in position upon the water bed and support the side walls in suitable relation to the tube or tubes.

8. In a subaqueous tunnel, a preconstructed tunnel tube section composed of one or more tubes and an outer frame or cradle adapting the section to serve as the form for embedding the tube or tubes into concrete, the same consisting of a series of transverse diaphragms secured upon the tube or tubes and constituting the partition walls of the form, and wooden sheathing secured to the edges of the diaphragms and forming the side walls of the mold, the diaphragms being of a shape to support the tube or tubes in position upon the water bed and support the side walls in suitable relation to the tube or tubes for filling in the concrete.

9. In a subaqueous tunnel, a preconstructed tunnel tube section composed of a pair of tubes and an outer frame or cradle adapting the section to serve as a form for embedding the tubes into concrete, the same consisting of a series of transverse diaphragms secured upon the tubes at intervals and divided in halves secured together at their meeting edges and side walls secured to the diaphragms, the diaphragms being of a shape to support the tubes in position upon the water bed and to support the side walls in proper relation to the tubes for embedding them in concrete.

10. In a subaqueous tunnel, a preconstructed tunnel tube section composed of a pair of tubes and an outer frame or cradle adapted to support the tubes in position upon the water bed and serve as a form for embedding them in concrete, the same consisting of a series of transverse diaphragms of approximately rectangular shape secured upon the tubes at intervals and side walls secured to the lateral edges of the diaphragms and constituting the sides of the form, the space between the side walls being divided by the diaphragms into separate pockets.

11. In a subaqueous tunnel, a preconstructed tunnel tube section composed of a pair of tubes and an outer frame or cradle adapted to support the tubes in position upon the water bed and serve as a form for embedding them in concrete, the same consisting of a series of transverse diaphragms of approximately rectangular shape secured upon the tubes at intervals and side walls secured to the edges of the diaphragms, the space between the side walls being divided by the diaphragms into separate pockets open on top and bottom.

12. In a subaqueous tunnel, a preconstructed tunnel section composed of a pair of tubes and an outer frame or cradle adapted to support the tubes in position upon the water bed and serve as a form for embedding them in concrete, the same consisting of a series of transverse diaphragms secured upon the tubes at intervals and side walls secured to the ends of the diaphragms, the diaphragms being divided into halves between the tubes and means at the meeting edges of the halves for securing the tubes together lengthwise adjustable in relation to each other.

13. In a subaqueous tunnel, a preconstructed tunnel section composed of a pair of tubes and an outer frame or cradle adapted to support the tubes in position upon the water bed and serve as a form for embedding them thereon in concrete, the same consisting of a series of transverse partitions secured upon the tubes and side walls secured to the partitions, the diaphragms being of a size and shape to divide the form into separate pockets open at top and bottom.

14. The combination of two tunnel tube sections having ends adapted to be engaged with each other, a pilot pin secured to the end of one section and a guide lug at the end of the other section into which the pilot pin is adapted to engage and guide the tubes into alinement with each other.

15. The combination of two tunnel tube sections having ends adapted to be engaged with each other, a taper pointed pilot pin secured to the end of one section, and a guide lug secured to the end of the other section and having a bell mouthed socket to receive the pilot pin.

16. The combination of two tunnel tube sections having ends adapted to be engaged with each other, two taper pointed pilot pins secured to the end of one of the sections at diametrically opposite points, and guide lugs correspondingly secured to the ends of the other section and having guide sockets to receive the pilot pins to guide the sections into alinement with each other.

17. The combination of two tunnel tube sections having ends adapted to be engaged with each other, a pilot pin secured to one of said ends, a guide lug secured to the other end and having a socket with which the guide pin is adapted to register, and means provided on the pilot pin for locking it in engagement with the guide lug.

18. The combination of two tunnel tube sections having ends adapted to be engaged with each other, a pilot pin secured to one of said ends, and a guide lug correspondingly secured to the other end and provided with a socket adapted to receive and guide the pilot pin into engagement therewith, the pilot pin being taper pointed and provided with an eye in the point for the attachment of a line.

19. The combination of one tube section provided at one end with a sleeve forming an enlarged socket thereon, another tube section having one end adapted to enter into said socket and form an annular space between it and the sleeve, a gasket supported on the bottom of the socket and adapted to form a tight joint with the end of the other tube section, another gasket supported at the extreme end of the sleeve, a flange on the other section adapted to coöperate with said second gasket and form a tight joint therewith and means exteriorly of the tubes for bolting the ends thereof together.

20. The combination of one tube section provided at one end with a sleeve forming an enlarged socket thereon, another tube section having one end adapted to enter into said socket and form an annular space between it and the sleeve, a gasket supported on the bottom of the socket and adapted to coöperate with and form a tight joint with the end of the other tube section, said end being suitably formed, a channel flange around the extreme end of the sleeve, another gasket secured in said channel flange, an angle flange on the other tube section adapted to form a tight joint with the last named gasket and means for bolting the aforesaid flanges together.

21. The combination of one tube section provided at one end with a sleeve forming an enlarged socket thereon, another tube section adapted to be entered with one end into said sleeve and form an annular cylindrical space between it and the sleeve, means for forming a water tight joint between the sleeve and the end of the other tube section and means independent of the aforesaid means for guiding said end into the sleeve and centering it therein.

22. The combination of one tube section provided at one end with a sleeve forming an enlarged socket at the end thereof, another tube section having one end adapted to enter into and form an annular space between it and the sleeve, means for inclosing said space between water tight joints and means at the sleeve for filling the space with liquid cement.

23. In a sub-aqueous tunnel, the combination with a preconstructed tunnel tube section comprising one or more tubes closed at the ends and provided with means for admitting water into the same for sinking the section, of air caissons detachably mounted upon the section and adapted to sustain and evenly balance the section when submerged, the air caissons being provided with means for admitting water into the same and for expelling it therefrom.

In testimony whereof I affix my signature in presence of two witnesses.

OLAF HOFF.

Witnesses:
C. R. STICKNEY,
OTTO F. BARTHEL.